United States Patent
Yang

(10) Patent No.: US 10,286,974 B2
(45) Date of Patent: May 14, 2019

(54) PEDAL CONNECTING MECHANISM AND ELECTRIC BALANCE SCOOTER EMPLOYING SAME

(71) Applicant: Zhejiang Raymond Way Electronic Technology Co., Ltd, Wuyi, Zhejiang (CN)

(72) Inventor: Zhijun Yang, Guangdong (CN)

(73) Assignee: Zhejiang Raymond Way Electronic Technology Co., Ltd, Wuyi (CN)

( * ) Notice: Subject to any disclaimer, the term of this patent is extended or adjusted under 35 U.S.C. 154(b) by 0 days.

(21) Appl. No.: 15/414,663

(22) Filed: Jan. 25, 2017

(65) Prior Publication Data

US 2017/0217530 A1    Aug. 3, 2017

(30) Foreign Application Priority Data

Feb. 3, 2016  (CN) .......................... 2016 1 0077468

(51) Int. Cl.
| | |
|---|---|
| B62D 61/00 | (2006.01) |
| B62K 23/08 | (2006.01) |
| B62K 11/00 | (2006.01) |
| B60K 1/02 | (2006.01) |

(52) U.S. Cl.
CPC .............. B62K 23/08 (2013.01); B60K 1/02 (2013.01); B62K 11/007 (2016.11); *B62K 2202/00* (2013.01); *B62K 2204/00* (2013.01); *B62K 2207/00* (2013.01); *B62K 2208/00* (2013.01)

(58) Field of Classification Search
CPC ...... B62K 23/08; B62K 11/007; B62K 17/00; B62K 2202/00
See application file for complete search history.

(56) References Cited

U.S. PATENT DOCUMENTS

| | | | | |
|---|---|---|---|---|
| 3,741,540 | A * | 6/1973 | Shimizu | A63B 22/0056 482/128 |
| 6,761,666 | B2 * | 7/2004 | Chou | A63B 22/0056 482/52 |
| 6,899,657 | B2 * | 5/2005 | Chuang | A63B 22/001 482/147 |
| 6,921,353 | B2 * | 7/2005 | Chuang | A63B 22/0058 482/146 |

(Continued)

FOREIGN PATENT DOCUMENTS

CN           204956786 U        1/2016

*Primary Examiner* — James M Dolak

(57) ABSTRACT

A pedal connecting mechanism comprises a left pedal, a right pedal and a transverse connecting member, wherein a first cylindrical shaft is provided along the bottom of the left pedal; a first supporting member is provided on the left side of a top wall of the transverse connecting member, and a first groove is provided on the first supporting member; the first cylindrical shaft is provided inside the first groove so that the left pedal is rotatably connected to the first supporting member; a second cylindrical shaft is provided along the bottom of the right pedal; a second supporting member is provided on the right side of the top wall of the transverse connecting member, and a second groove is provided on the second supporting member; and the second cylindrical shaft is provided inside the second groove so that the right pedal is rotatably connected to the second supporting member.

6 Claims, 2 Drawing Sheets

(56) References Cited

U.S. PATENT DOCUMENTS

| | | | | |
|---|---|---|---|---|
| 7,303,032 B2* | 12/2007 | Kahlert | ............ | B62D 61/00 180/21 |
| 7,497,811 B2* | 3/2009 | Kumar | ............ | A63B 21/0083 482/57 |
| 7,717,200 B2* | 5/2010 | Kakinuma | ............ | A63C 17/08 180/218 |
| 7,771,327 B1* | 8/2010 | Reams | ............ | A63B 21/0552 482/123 |
| 8,028,777 B2* | 10/2011 | Kakinuma | ............ | A63C 17/08 180/218 |
| 8,109,860 B2* | 2/2012 | Lo | ............ | A63B 5/00 482/123 |
| 8,738,278 B2* | 5/2014 | Chen | ............ | B62K 11/007 180/218 |
| 9,039,583 B2* | 5/2015 | Huang | ............ | A63B 23/10 482/123 |
| 9,156,516 B2* | 10/2015 | Kahlert | ............ | B62H 1/12 |
| 9,376,155 B2* | 6/2016 | Ying | ............ | B62D 51/001 |
| 9,403,573 B1* | 8/2016 | Mazzei | ............ | B62D 51/02 |
| 9,499,228 B2* | 11/2016 | Chang | ............ | B62K 3/002 |
| 9,623,282 B2* | 4/2017 | Tung | ............ | A63B 21/0552 |
| 9,656,688 B2* | 5/2017 | Ying | ............ | B62D 11/003 |
| 9,896,146 B2* | 2/2018 | Lu | ............ | B62K 3/007 |
| 9,919,181 B1* | 3/2018 | Lee | ............ | A63B 21/4034 |
| RE46,964 E * | 7/2018 | Chen | ............ | B62K 11/007 |
| 10,144,477 B2* | 12/2018 | Lankford | ............ | B62K 11/007 |
| 10,144,478 B2* | 12/2018 | Ying | ............ | B62K 11/007 |
| 10,167,036 B2* | 1/2019 | Ying | ............ | B62D 51/001 |
| 10,167,037 B2* | 1/2019 | Ying | ............ | B62K 11/007 |
| 2012/0166048 A1* | 6/2012 | Inoue | ............ | G05D 1/0061 701/49 |

\* cited by examiner

PEDAL CONNECTING MECHANISM AND ELECTRIC BALANCE SCOOTER EMPLOYING SAME

CROSS REFERENCE TO RELATED APPLICATIONS

The present application claims the benefit of Chinese patent application No. 201610077468.X filed on Feb. 3, 2016. All the above are hereby incorporated by reference.

TECHNICAL FIELD

The present invention relates to the technical field of scooters, in particular to a pedal connecting mechanism and an electric balance scooter employing the same.

BACKGROUND ART

Electric balance scooter, also known as a motion-sensing scooter, Segway, etc., is a personal mobility device very popular among modern people, which can meet people's needs of leisure and entertainment in an environmentally friendly and healthy way. An electric balance scooter is based on the principle of "dynamic stabilization", where the gyroscopes and acceleration sensors inside the scooter body are used to judge the posture state of the scooter body, and a precise and high-speed central microprocessor is used to calculate the appropriate commands, and the motors are driven to perform corresponding adjustments so as to maintain the balance of the system.

The existing balance scooters are in various and diverse forms.

There is one type of balance scooters in the market which are equipped with a directional lever; during use, a user controls the direction of movement of the balance scooter by adjusting the directional lever; the operation is complex, and the user may take great effort to adjust the directional lever. Moreover, the user needs to hold the directional lever by hand, and cannot do stretching and other actions at will, thereby reducing the fun of playing with the scooter.

Chinese patent application number 201520567850.X discloses a two-wheeled balance scooter which can adjust the state of motion of the scooter without using a directional lever. However, the left and right pedals of the balance scooter is connected via an intermediate shaft; during use, all the gravity of the human body is borne by the intermediate shaft; the twisting of the balance scooter body would easily damage the intermediate shaft, or even cause the intermediate shaft to be broken; therefore such a structure for the balance scooter is prone to failure, and has relatively low stability, reliability and safety. In addition, the balance scooter designed with an intermediate shaft has a large reaction error.

SUMMARY OF THE INVENTION

In order to avoid the drawbacks of the prior art, the present invention provides a pedal connecting mechanism, which is provided with a transverse connecting member at the bottoms of the left pedal and the right pedal, wherein the left pedal and the right pedal are not connected via an intermediate shaft, instead, they are two independent bodies, and their states of motion are independently controlled by the left foot and right foot, respectively; the transverse connecting member is used to distribute the gravity of human body and is uniformly stressed. This design is novel and reasonable, and is conducive to prolonging the service life.

A further object of the present invention is to provide an electric balance scooter employing the pedal connecting mechanism, which is provided with a transverse connecting member at the bottoms of the pedals. During use, the transverse connecting member bears the gravity of the human body and is uniformly stressed, and damage to the structure of the balance scooter is reduced, so that the balance scooter has a good stability and is reliable and safe.

The first object of the present invention can be achieved by adopting the following technical solution:

a pedal connecting mechanism comprises a left pedal, a right pedal and a transverse connecting member, wherein a first cylindrical shaft is provided along the bottom of the left pedal; a first supporting member is provided on the left side of a top wall of the transverse connecting member, and a first groove matching the first cylindrical shaft is provided on the first supporting member; the first cylindrical shaft is provided inside the first groove so that the left pedal is rotatably connected to the first supporting member; a second cylindrical shaft is provided along the bottom of the right pedal; a second supporting member is provided on the right side of the top wall of the transverse connecting member, and a second groove matching the second cylindrical shaft is provided on the second supporting member; and the second cylindrical shaft is provided inside the second groove so that the right pedal is rotatably connected to the second supporting member.

Preferably, the first cylindrical shaft is composed of two transversely arranged first cylinders, which are symmetrically provided on two sides of the bottom of the left pedal; two first supporting members are correspondingly provided on the left side of the top wall of the transverse connecting member, and a first groove matching the first cylinder is provided on each of the first supporting members; the left pedal is rotatably connected to the first supporting members; the second cylindrical shaft is composed of two transversely arranged second cylinders, which are symmetrically provided on two sides of the bottom of the right pedal; two second supporting members are correspondingly provided on the right side of the top wall of the transverse connecting member, and a second groove matching the second cylinder is provided on each of the second supporting members; and the right pedal is rotatably connected to the second supporting members.

Preferably, the pedal connecting mechanism further comprises a first elastic member and a second elastic member, wherein one end of the first elastic member is connected to the bottom of the left pedal, and the other end thereof is correspondingly connected to the left side of the top wall of the transverse connecting member; and one end of the second elastic member is connected to the bottom of the right pedal, and the other end thereof is connected to the right side of the top wall of the transverse connecting member.

Preferably, the first elastic member and the second elastic member are both springs.

Preferably, the number of the first elastic members is four, and one end of each of the four first elastic members is respectively connected to each of the four corners of the bottom of the left pedal and the other end thereof is respectively connected to the left side of the top wall of the transverse connecting member; and the number of the second elastic members is four, and one end of each of the four second elastic members is respectively connected to each of the four corners of the bottom of the right pedal and the other end thereof is respectively connected to the right side of the top wall of the transverse connecting member.

Preferably, the transverse connecting member is a flat plate, two sides being symmetrically inwardly recessed at a middle part in a longitudinal direction of the flat plate.

The other object of the present invention can be achieved by adopting the following technical solution:

an electric balance scooter employing the pedal connecting mechanism comprises a housing, the pedal connecting mechanism, wheels, electric motors, sensing systems, at least one signal processor and a power supply, wherein an accommodation cavity is provided in the housing, and a left-right symmetrical first notch and second notch are provided in a top face of the accommodation cavity; the first notch matches the left pedal; the second notch matches the right pedal;

the pedal connecting mechanism is provided within the accommodation cavity, in which the left pedal is provided within the first notch and the right pedal is provided within the second notch;

the wheels comprise a left wheel and a right wheel, which are respectively provided on left and right sides of the housing;

the electric motors comprise a first electric motor and a second electric motor; the first electric motor is provided in the left wheel, with a power output end being connected to the left wheel for driving the left wheel; the first electric motor receives a signal transmitted from the signal processor and then controls the state of motion of the left wheel; the second electric motor is provided in the right wheel, with a power output end being connected to the right wheel for driving the right wheel; the second electric motor receives a signal transmitted from the signal processor and then controls the state of motion of the right wheel;

the sensing systems comprise a first sensing system which is provided at the bottom of the left pedal and parallel to the left pedal, and a second sensing system which is provided at the bottom of the right pedal and parallel to the right pedal; the first sensing system comprises a first sensing element and at least one first touch sensing switch; the first sensing element senses the state of motion of the left pedal, a signal output end of first sensing element being connected to a signal input end of the signal processor; a signal output end of the first touch sensing switch is connected to a signal input end of the first electric motor;

the second sensing system comprises a second sensing element and at least one second touch sensing switch; the second sensing element senses the state of motion of the right pedal, a signal output end of the second sensing element being connected to a signal input end of the signal processor; a signal output end of the second touch sensing switch is connected to a signal input end of the second electric motor;

the at least one data processor is provided within the accommodation cavity, signal input ends of the data processor are connected to the signal output ends of the sensing systems, and a signal output end of the data processor is connected to a signal input end of the electric motor; and the power supply is provided in the accommodation cavity to supply electric power to the electric balance scooter.

Preferably, the number of the signal processors is one; the first sensing element comprises a first gyroscope and a first acceleration sensor; a signal output end of the first gyroscope is connected to a first signal input end of the signal processor; a signal output end of the first acceleration sensor is connected to a second signal input end of the signal processor; the second sensing element comprises a second gyroscope and a second acceleration sensor; a signal output end of the second gyroscope is connected to a third input end of the signal processor; and a signal output end of the second acceleration sensor is connected to a fourth input end of the signal processor.

Preferably, the number of the signal processors is two, which are denoted as a first signal processor and a second signal processor, respectively; the first sensing element comprises a first gyroscope and a first acceleration sensor; a signal output end of the first gyroscope is connected to a first signal input end of the first signal processor; a signal output end of the first acceleration sensor is connected to a second signal input end of the first signal processor; the second sensing element comprises a second gyroscope and a second acceleration sensor; a signal output end of the second gyroscope is connected to a first input end of the second signal processor; and a signal output end of the second acceleration sensor is connected to a second input end of the second signal processor.

Preferably, the number of the first touch sensing switches is two, and the number of the second touch sensing switches is two.

The technical solutions provided in the present invention can have the following beneficial effects:

(1) In the pedal connecting mechanism provided in the present invention, a transverse connecting member is provided at the bottoms of the left pedal and the right pedal, the left pedal and the right pedal are respectively rotatably connected to the transverse connecting member, the left pedal and the right pedal are independent of each other; when the balance scooter is in use, the gravity applied by the human body to the pedals is transmitted to the transverse connecting member, and the transverse connecting member bears the gravity of the human body and is uniformly stressed, avoiding the drawback that an intermediate shaft, which is used to connect the left pedal with the right pedal of the balance scooter of the prior art and bear the gravity of the human body, is easily worn or even broken. The balance scooter made by using this pedal connecting mechanism is reliable, safe and durable.

(2) In the pedal connecting mechanism provided in the present invention, elastic members are provided between the pedals and the transverse connecting member, so that the user feels cushioned to a certain extent after stepping on the pedals, thereby increasing the comfort.

(3) The pedal connecting mechanism provided in the present invention can be applied not only to a double-wheeled balance scooter, but also to a three-wheeled balance scooter, a four-wheeled balance scooter, a six-wheeled balance scooter or other suitable types of scooters, and has a wide range of applications, strong practicality, and great business prospects.

(4) In the electric balance scooter provided in the present invention, the left and right pedals are respectively provided with a sensing system, the sensing system of the left pedal senses the state of motion of the left foot and the sensing system of the right pedal senses the state of motion of the right foot, the sensing systems respectively transmit signals to the signal processor, the signal processor produces terminal signals and then transmits the same to the electric motors, and the motions of the wheels are controlled by means of the kinetic energy output from the electric motors; therefore, the left and right pedals are provided with separate sensing systems, so that the balance scooter has a more accurate and flexible response and a small error. In addition, there is no need for the electric balance scooter of such a structure to be provided with a directional lever, and the user only need to rely on the movement of his/her body and feet to control the operation of the balance scooter, so that the operation is flexible and convenient, allowing the user to better enjoy the fun of playing with the scooter and making the balance scooter aesthetic and decent.

(5) In the electric balance scooter provided in the present invention, the first sensing system is provided with two first touch sensing switches, and the second sensing system is provided with two second touch sensing switches; one of the first sensing switches and one of the second touch sensing switches are standby switches; therefore, the electric balance scooter is provided with standby switches, which is convenient and practical, avoiding the drawback that if only one switch is provided, the balance scooter cannot start when the switch is broken.

(6) The electric balance scooter provided in the present invention may be provided with either one signal processor or two signal processors. When two signal processors are provided, the two signal processors respectively receive the input signals from the first two sensing system and the second sensing system, and respectively output signals, so that the processing precision is high, and a more flexible operation is ensured.

REFERENCE NUMERALS

10. left pedal; 11. first cylindrical shaft; 12. first elastic member; 20. right pedal; 21. second cylindrical shaft; 22. second elastic member; 30. transverse connecting member; 31. first supporting member; and 32. second supporting member.

The accompanying drawings herein, which are incorporated in the description and constitute a part thereof, illustrate embodiments consistent with the present invention and are used together with the description to explain the principles of the present invention.

DETAILED DESCRIPTION

The present invention is further described in detail below by particular embodiments and with reference to the accompanying drawings.

Figure 1:
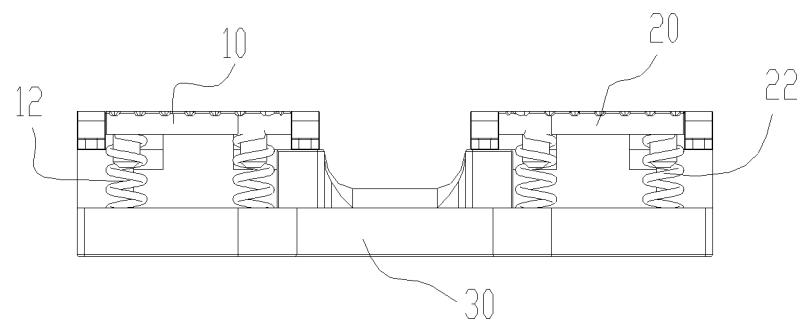
FIG. 1 is a front view of a pedal connecting mechanism provided in an embodiment of the present invention.
Figure 2:
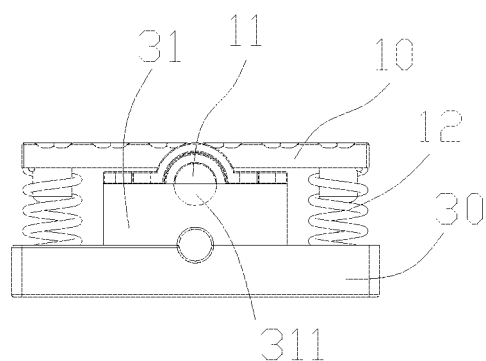
FIG. 2 is a left view of the pedal connecting mechanism provided in the embodiment of the present invention.
Figure 3:
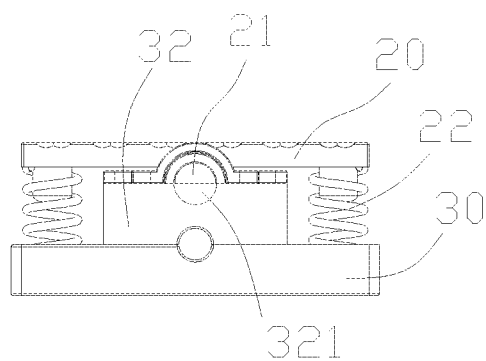
FIG. 3 is a right view of the pedal connecting mechanism provided in the embodiment of the present invention.
Figure 4:
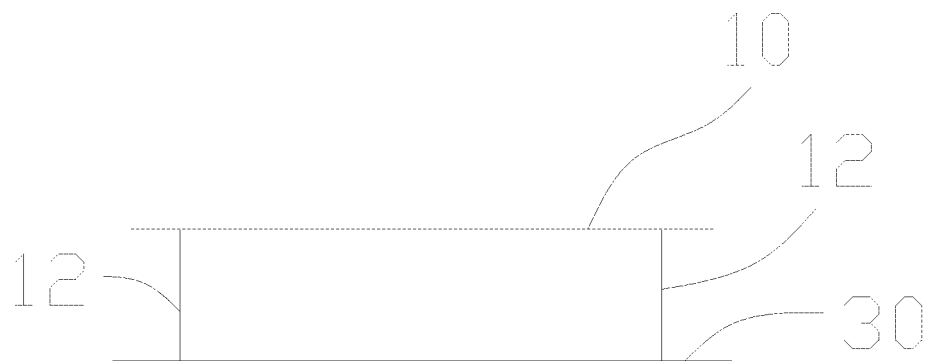
FIG. 4 is a schematic right view of the assembled left pedal, the first elastic members and the transverse connecting member in accordance with an embodiment of the present invention.
Figure 5:
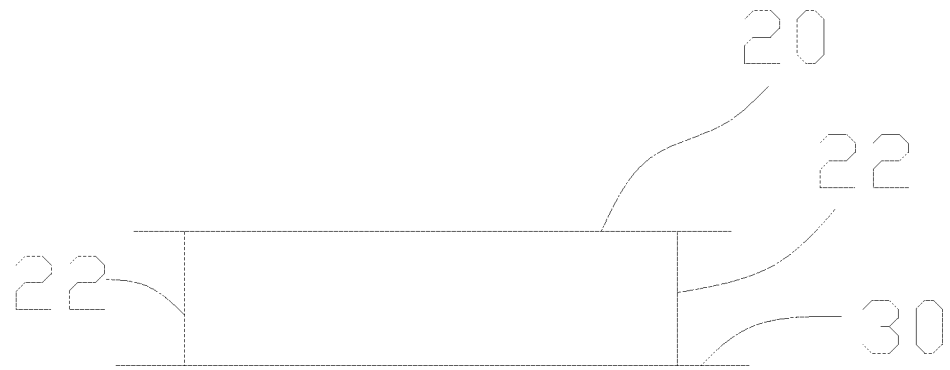
FIG. 5 is a schematic left view of the assembled right pedal, the second elastic members and the transverse connecting member in accordance with an embodiment of the present invention.

As shown in FIG. 1, a pedal connecting mechanism comprises a left pedal 10, a right pedal 20 and a transverse connecting member 30, wherein a first cylindrical shaft 11 is centrally and transversely provided along the bottom of the left pedal 10; a first supporting member 31 is provided on the left side of a top wall of the transverse connecting member 30, and a first groove 311 matching the first cylindrical shaft 11 is provided on the first supporting member 31; the first cylindrical shaft 11 is provided inside the first groove 311 so that the left pedal 10 is rotatably connected to the first supporting member 31; a second cylindrical shaft 21 is centrally and transversely provided along the bottom of the right pedal 20; a second supporting member 32 is provided on the right side of the top wall of the transverse connecting member 30, and a second groove 321 matching the second cylindrical shaft 21 is provided on the second supporting member 32; and the second cylindrical shaft 21 is provided inside the second groove 321 so that the right pedal 20 is rotatably connected to the second supporting member 32.

The arrangement of the pedal connecting mechanism will be further described below.

The first cylindrical shaft 11 is composed of two transversely arranged first cylinders, which are symmetrically provided on two sides of the bottom of the left pedal 10; two first supporting members 31 are correspondingly provided on the left side of the top wall of the transverse connecting member 30, and a first groove matching the first cylinder is provided on each of the first supporting members 31; the left pedal 10 is rotatably connected to the first supporting members 31; the second cylindrical shaft 21 is composed of two transversely provided second cylinders, which are symmetrically provided on two sides of the bottom of the right pedal 20; two second supporting members 32 are correspondingly provided on the right side of the top wall of the transverse connecting member 30, and a second groove matching the second cylinder is provided on each of the second supporting members 32; and the right pedal 20 is rotatably connected to the second supporting members 32.

Preferably, the pedal connecting mechanism further comprises a first elastic member 12 and a second elastic member 22, wherein one end of the first elastic member 12 is connected to the bottom of the left pedal 10, and the other end thereof is correspondingly connected to the left side of the top wall of the transverse connecting member 30; and one end of the second elastic member 22 is connected to the bottom of the right pedal 20, and the other end thereof is connected to the right side of the top wall of the transverse connecting member 30. The first elastic member 12 and the second elastic member 22 may be both provided as, but not limited to, springs, and may be provided as other suitable elastic members. The elastic members allow the user to feel cushioned to a certain extent after stepping on the pedals, thereby increasing the comfort. The number of first elastic members 12 is four, and one end of each of the four first elastic members 12 is respectively connected to each of the four corners of the bottom of the left pedal 10 and the other end thereof is respectively connected to the left side of the top wall of the transverse connecting member 30; and the number of second elastic members 22 is four, and one end of each of the four second elastic members 22 is respectively connected to each of the four corners of the bottom of the right pedal 20 and the other end thereof is respectively connected to the right side of the top wall of the transverse connecting member 30.

Preferably, the transverse connecting member 30 may be provided as a flat plate, two sides being symmetrically inwardly recessed at a middle part in a longitudinal direction of the flat plate.

In the pedal connecting mechanism provided in the embodiment of the present invention, the transverse connecting member 30 is provided at the bottoms of the left pedal 10 and the right pedal 20, the left pedal 10 and the right pedal 20 are respectively rotatably connected to the transverse connecting member 30, and the left pedal 10 and the right pedal 20 are independent of each other; when the balance scooter is in use, the gravity applied by the human body to the pedals is transmitted to the transverse connecting member 30, the transverse connecting member 30 bears the gravity of the human body and is uniformly stressed, avoiding the drawback that an intermediate shaft, which is used to connect the left pedal with the right pedal of the balance scooter of the prior art and bears the gravity of the human body, is easily worn or even broken. The balance scooter made by using this pedal connecting mechanism is reliable, safe and durable. Furthermore, the pedal connecting mechanism can be applied not only to a double-wheeled balance scooter, but also to a three-wheeled balance scooter, a four-wheeled balance scooter, a six-wheeled balance scooter or other suitable types of scooters, and has a wide range of applications, strong practicality, and great business prospects.

The present invention further provides an electric balance scooter employing the pedal connecting mechanism comprises a housing, the pedal connecting mechanism, wheels, electric motors, sensing systems, at least one signal processor and a power supply, wherein an accommodation cavity is provided in the housing, and a left-right symmetrical first notch and second notch are provided in a top face of the accommodation cavity; the first notch matches the left pedal 10; the second notch matches the right pedal 20; the pedal connecting mechanism is provided within the accommodation cavity, in which the left pedal 10 is provided within the first notch and the right pedal 20 is provided within the second notch; the wheels comprise a left wheel and a right wheel, which are respectively provided on left and right sides of the housing; the electric motors comprise a first electric motor and a second electric motor; the first electric motor is provided in the left wheel, with a power output end being connected to the left wheel for driving the left wheel; the first electric motor receives a signal transmitted from the signal processor and then controls the state of motion of the left wheel; the second electric motor is provided in the right wheel, with a power output end being connected to the right wheel for driving the right wheel; the second electric motor receives a signal transmitted from the signal processor and then controls the state of motion of the right wheel; the sensing systems comprise a first sensing system which is provided at the bottom of the left pedal 10 and parallel to the left pedal 10, and a second sensing system which is provided at the bottom of the right pedal 20 and parallel to the right pedal 20; the first sensing system comprises a first sensing element and at least one first touch sensing switch; the first sensing element senses the state of motion of the left pedal 10, a signal output end thereof being connected to a signal input end of the signal processor; a signal output end of the first touch sensing switch is connected to a signal input end of the first electric motor; the second sensing system comprises a second sensing element and at least one second touch sensing switch; the second sensing element senses the state of motion of the right pedal 20, a signal output end thereof being connected to a signal input end of the signal processor; a signal output end of the second touch sensing switch is connected to a signal input end of the second electric motor; the at least one data processor is provided within the accommodation cavity, signal input ends of the data processor are connected to the signal output ends of the sensing systems, and a signal output end of the data processor is connected to a signal input end of the electric motor; and the power supply is provided in the accommodation cavity to supply electric power to the electric balance scooter.

The arrangements of the sensing systems and the signal processor will be further described below.

The number of signal processors is one; the first sensing element comprises a first gyroscope and a first acceleration sensor; a signal output end of the first gyroscope is connected to a first signal input end of the signal processor; a signal output end of the first acceleration sensor is connected to a second signal input end of the signal processor; the second sensing element comprises a second gyroscope and a second acceleration sensor; a signal output end of the second gyroscope is connected to a third input end of the signal processor; and a signal output end of the second acceleration sensor is connected to a fourth input end of the signal processor.

Alternatively, the number of signal processors is two, which are denoted as a first signal processor and a second signal processor, respectively; the first sensing element comprises a first gyroscope and a first acceleration sensor; a signal output end of the first gyroscope is connected to a first signal input end of the first signal processor; a signal output end of the first acceleration sensor is connected to a second signal input end of the first signal processor; the second sensing element comprises a second gyroscope and a second acceleration sensor; a signal output end of the second gyroscope is connected to a first input end of the second signal processor; and a signal output end of the second acceleration sensor is connected to a second input end of the second signal processor.

Furthermore, the number of first touch sensing switches may be two; the number of second touch sensing switches may be two; one of the first sensing switches and one of the second touch sensing switches are standby switches; therefore, standby switches are provided, which is convenient and practical, avoiding the drawback that if only one switch is provided, the balance scooter cannot start when the switch is broken.

The operating principle of the electric balance scooter provided in the present invention is as follows:

During the operation of the electric balance scooter, when the user's left foot steps on the left pedal 10, the first touch sensing switch is turned on, and when the right foot steps on the right pedal 20, the second touch sensing switch is turned on. The user's left foot stepping on the left pedal 10 tilts the left pedal 10 forward or backward, and at the same time, the first sensing system, which is connected to the bottom of the left pedal 10 in parallel, is tilted forward or backward along with the left pedal 10; in this case, the first sensing element detects the state of motion of the left pedal 10 at any time and transmits the signal to the signal processor which feeds the signal back to the first electric motor, and the state of motion of the left wheel is adjusted according to the power output from the first electric motor; and on the other hand, the user's right foot stepping on the right pedal 20 tilts the right pedal 20 forward or backward, and at the same time, the second sensing system, which is connected to the bottom of the right pedal 20 in parallel, is tilted forward or backward along with the right pedal 20; in this case, the second sensing element detects the state of motion of the right pedal 20 and transmits the signal to the signal processor which feeds the signal back to the second electric motor, and the state of motion of the right wheel is adjusted according to the power output from the second electric motor. When the user simultaneously presses the left pedal 10 and the right pedal 20 forward deeply, the left and right wheels are kept rolling forward, and the balance scooter moves forward; when the user simultaneously presses the left pedal 10 and the right pedal 20 backward deeply, the left and right wheels roll backward, and the balance scooter moves backward; and the balance scooter turns when the user's pressing actions cause the state of motions of the left pedal 10 and the right pedal 20 to be different. At the same time, the first sensing element and the second sensing element feed back the amplitude of swing of the user's body, causing the first electric motor and the second electric motor to obtain different power outputs, thereby adjusting the speed of the balance scooter.

For a person skilled in the art, a variety of other corresponding modifications and variations can be made according to the above-described technical solutions and concepts, and all the modifications and variations shall fall within the scope of protection of the claims of the present invention.

What is claimed is:

1. A pedal connecting mechanism, comprising a left pedal, a right pedal, a transverse connecting member, at least two first elastic members and at least two second elastic members, wherein a first cylindrical shaft is provided along a bottom of the left pedal; at least one first supporting member is provided on the left side of a top wall of the transverse connecting member, and a first groove matching the first cylindrical shaft is provided on the first supporting member; the first cylindrical shaft is provided inside the first groove so that the left pedal is rotatably connected to the first supporting member;

a second cylindrical shaft is provided along the bottom of the right pedal; at least one second supporting member is provided on the right side of the top wall of the transverse connecting member, and a second groove matching the second cylindrical shaft is provided on the second supporting member; and the second cylindrical shaft is provided inside the second groove so that the right pedal is rotatably connected to the second supporting member; and the transverse connecting member comprises a flat plate, the at least two first elastic members are connected between the left pedal and the flat plate of the transverse connecting member so that the left pedal is parallel to the flat plate of the transverse connecting member; the at least two second elastic members are connected between the right pedal and the flat plate of the transverse connecting member so that the right pedal is parallel to the flat plate of the transverse connecting member.

2. The pedal connecting mechanism of claim 1, wherein an arrangement direction of the left pedal and the right pedal is defined as a lateral direction, the first cylindrical shaft is composed of two first cylinders which are symmetrically located in the lateral direction on both sides of the bottom of the left pedal; wherein the at least one first supporting member comprises two first supporting members which are located on the left side of the top wall of the transverse connecting member, and the first groove matching the first cylinder is provided on each of the first supporting members; the left pedal is rotatably connected to the first supporting member;

the second cylindrical shaft is composed of two second cylinders which are symmetrically located in the lateral direction on both sides of the bottom of the right pedal; wherein the at least one second supporting member comprises two second supporting members which are located on the left side of the top wall of the transverse connecting member, and the second groove matching the second cylinder is provided on each of the second supporting members; the right pedal is rotatably connected to the second supporting member.

3. The pedal connecting mechanism of claim 1, wherein the pedal connecting mechanism comprises at least three first elastic members and at least three second elastic members, wherein one end of each of the at least three first elastic members is connected to the bottom of the left pedal, and the opposite end thereof is correspondingly connected to the left side of the top wall of the transverse connecting member; and one end of each of the at least three second elastic member is connected to the bottom of the right pedal, and the opposite end thereof is connected to the right side of the top wall of the transverse connecting member.

4. The pedal connecting mechanism of claim 1, wherein the pedal connecting mechanism comprises four first elastic members and four second elastic members, wherein one end of each of the four first elastic member is connected to the bottom of the left pedal, and the opposite end thereof is correspondingly connected to the left side of the top wall of the transverse connecting member; and one end of each of the four second elastic member is connected to the bottom of the right pedal, and the opposite end thereof is connected to the right side of the top wall of the transverse connecting member.

5. The pedal connecting mechanism of claim 4, wherein one end of each of the four first elastic members is respectively connected to each of the four corners of the bottom of the left pedal and the opposite end thereof is respectively connected to the left side of the top wall of the transverse connecting member; one end of each of the four second elastic members is respectively connected to each of the four corners of the bottom of the right pedal and the opposite end thereof is respectively connected to the right side of the top wall of the transverse connecting member.

6. The pedal connecting mechanism of claim 1, wherein the first elastic member and the second elastic member are both springs.

* * * * *